UNITED STATES PATENT OFFICE.

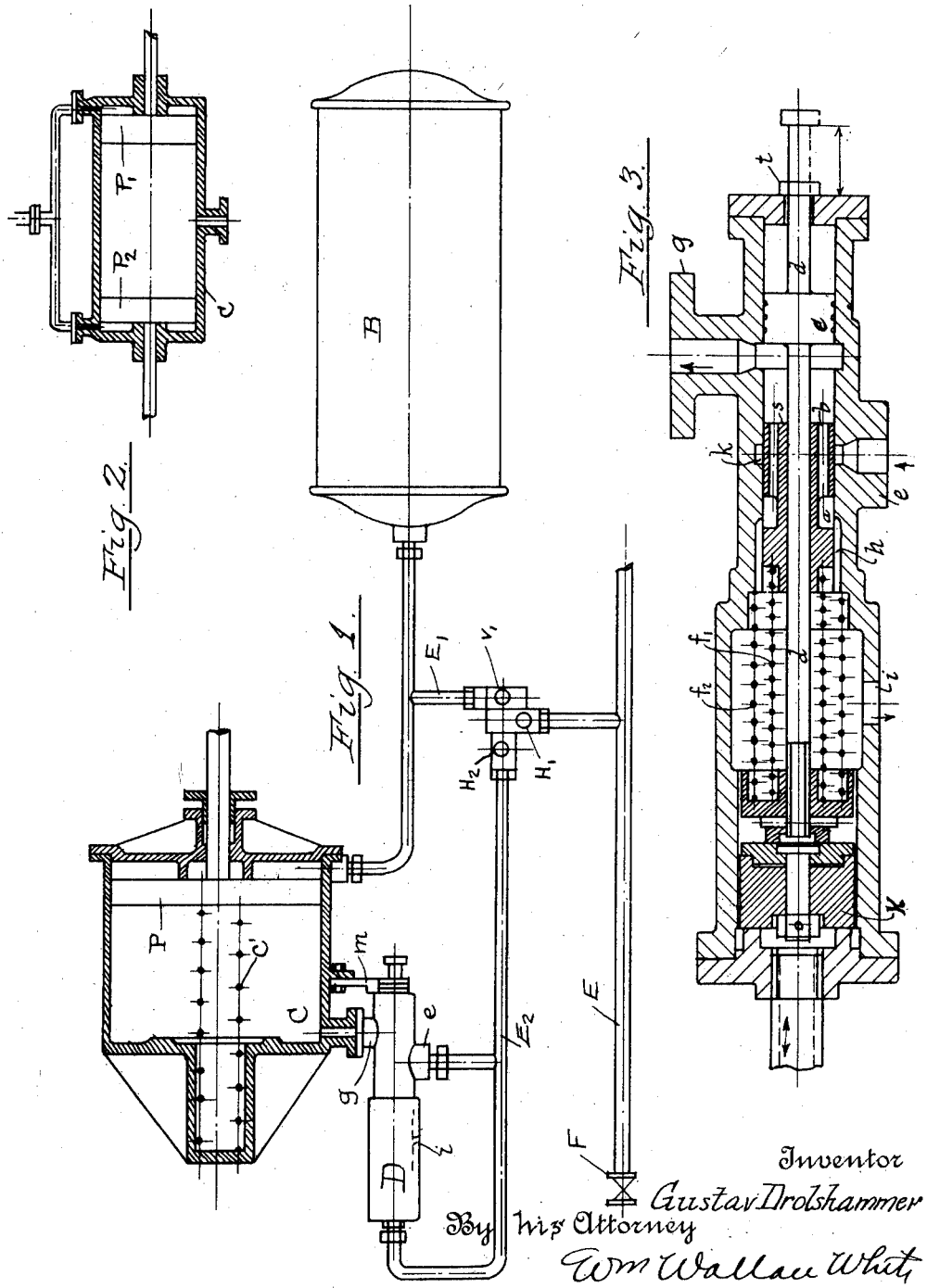

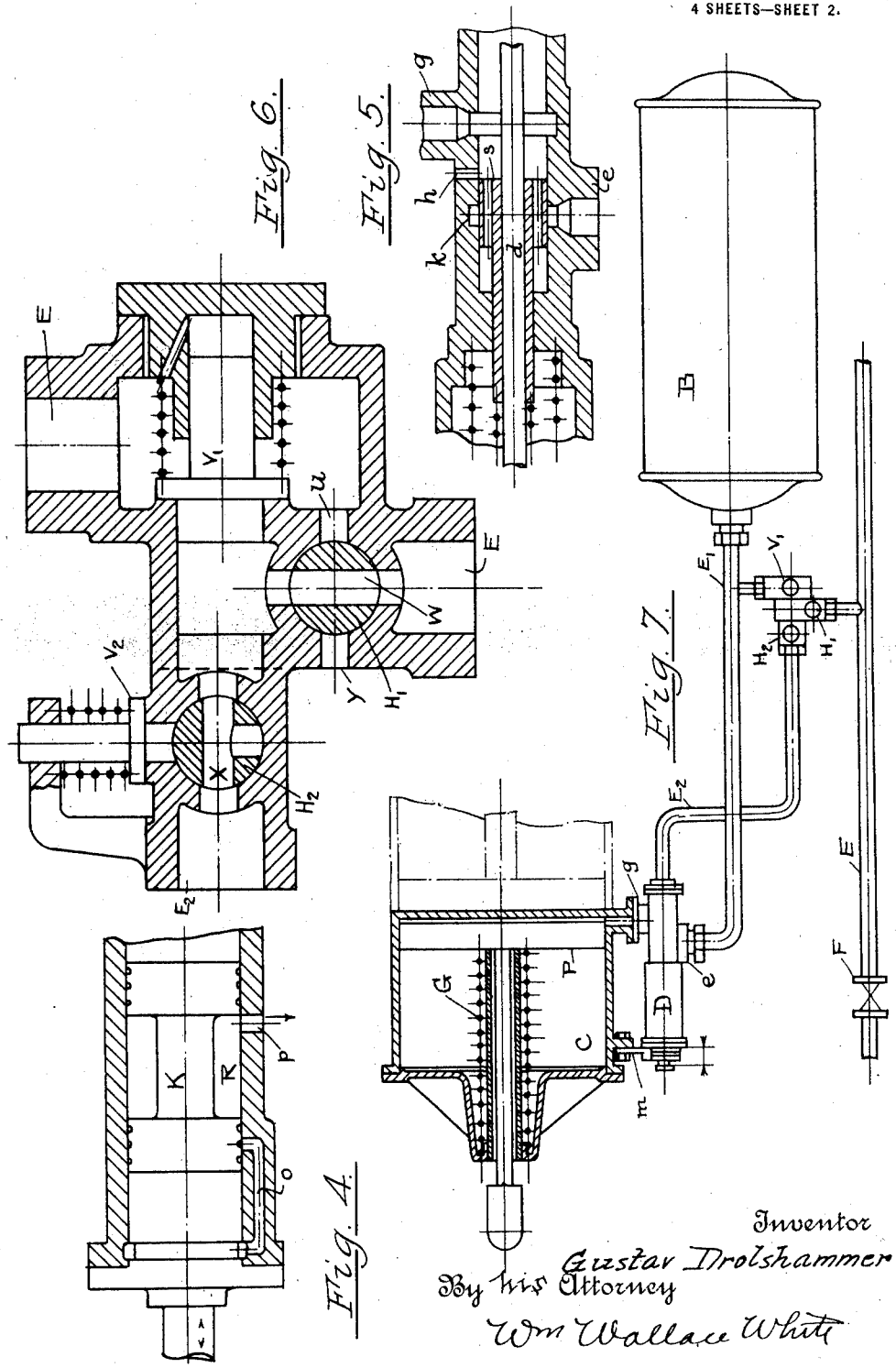

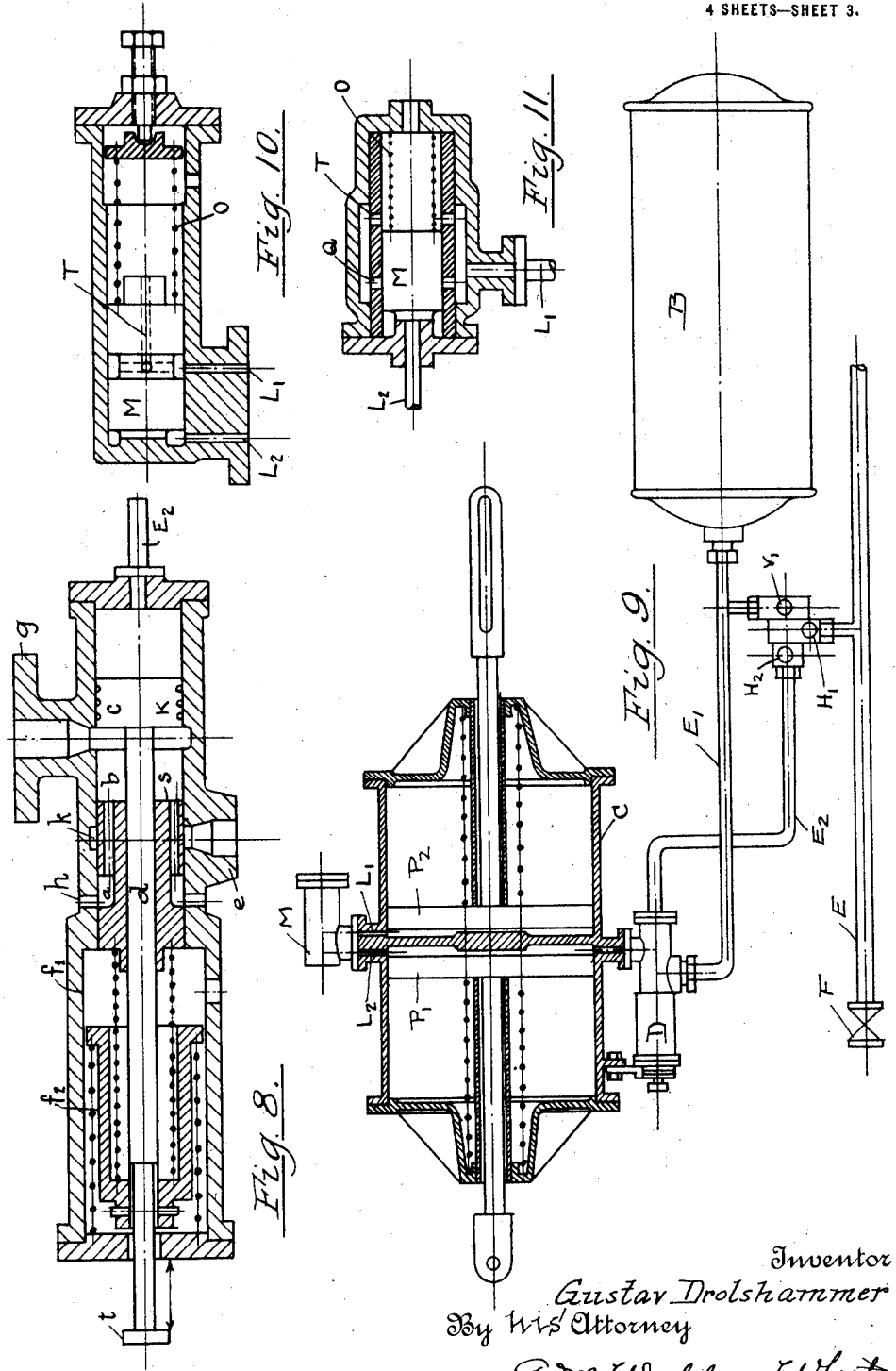

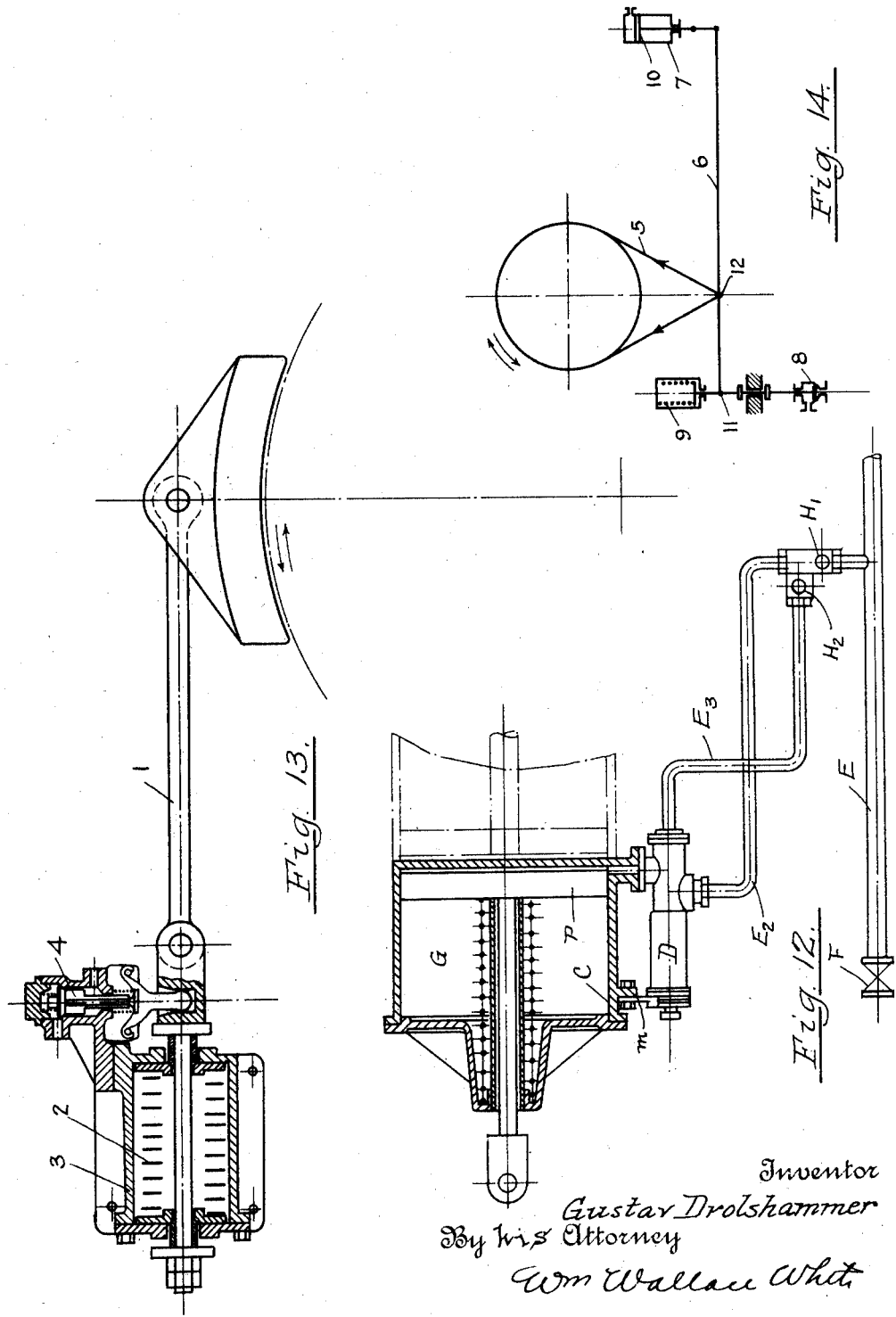

GUSTAV DROLSHAMMER, OF HAMAR, NORWAY, ASSIGNOR OF ONE-HALF TO IVAR DROLSHAMMER, OF DRAMMEN, NORWAY.

ADJUSTABLE BRAKE ARRANGEMENT OPERATED BY COMPRESSED FLUID, ADAPTED TO BE USED IN RAILWAY-TRAINS OR THE LIKE.

1,401,325.   Specification of Letters Patent.   Patented Dec. 27, 1921.

Application filed July 23, 1920. Serial No. 398,566.

*To all whom it may concern:*

Be it known that Engineer GUSTAV DROLSHAMMER, subject of the King of Norway, residing at Hamar, Norway, has invented new and useful Improvements in Adjustable Brake Arrangements Operated by Compressed Fluid, Adapted to be Used in Railway-Trains or the like, (for which I have filed application in Germany February 3, 1919,) of which the following is a specification.

This invention comprises improvements in and connected with brakes operated by fluid pressure. The well-known brakes with one, or two, or three chambers do not give perfect brake action, and are generally exceedingly complicated. Brakes with a single chamber do not as a rule permit of adjustment or regulation for any desired braking action. Insufficient control for regulation of the brake action, necessitates frequently repeated applications of the brake and a larger consumption of compressed air, which cannot be replenished quickly enough more especially when the train is long and the gradient steep. The pressure in the air receiver is therefore continually decreasing from one application of the brake to the next and the brake power is exhausted so that the driver loses control over the train. In using such brakes it has been found necessary therefore to have a secondary direct acting brake arrangement. The conditions are similar in the well-known brakes with two or three chambers. A two-chamber brake which permits a step-by-step application and a step-by-step release of the brake action has been introduced only quite recently. The rapid application of any desired brake action, however, is not perfectly attained even by this arrangement. The step-by-step brake action is only adjustable and regulatable by the brake piston that is to say, the action depends upon the condition in which the brake piston and its auxiliary piston happen to be, both being mounted on the same piston rod. If, then, there should be any appreciable leakage in these parts, the compressed air in the auxiliary air receiver will be lost and the brake power will be exhausted on long and steep gradients, and in addition there is the difficulty of a most complicated valve gearing which consists of three slide valves, two pistons, three regulating valves and one stop cock and also of the intricate release arrangement whereby the brake can be released after the stop cock has been closed. This brake arrangement also requires the use of two brake cylinders cast in one piece and comprising three chambers in which work two brake pistons and one auxiliary piston. It is also necessary to have respectively a charging reservoir and an air receiver together with the very complicated regulating valve aforesaid.

The present invention consists of a very simple brake arrangement with a single cylinder which without any complication makes it possible to adjust the brake action to any desired degree from zero to maximum, and from maximum to zero, and whereby the action of the brake can be kept permanently constant even if there should be an appreciable leakage at the brake piston and the pressure regulator. If for instance the effective pressure in the brake cylinder should be decreased by piston leakage, then the pressure regulator will at once automatically adjust the pressure to the pressure reduction fixed by the engine driver for the main air pipe. Even if the pressure regulator should be somewhat leaky this will make no difference as the fixed brake pressure will be at once automatically maintained by the escape of the air. The regulation is so sensitive that it is possible to increase or decrease the brake pressure and thereby the brake power as required to within $\tfrac{1}{10}$th of an atmosphere or less. The adjustment of the brake action by the engine driver acts nearly instantaneously and it operates on the last car in the train almost as quickly as on the first. Adjustment for maximum brake action can be effected by decrease of only $\tfrac{1}{2}$ atm. in the main air pipe, but it can also be made with a greater decrease or even with an entire release of the pressure where this is desirable in working together with other existing brakes. The brake power will never be exhausted by the small pressure reduction, as the pressure in the main conduit always acts as a reserve if the brake piston and other parts should be somewhat leaky. By reason of the small pressure reduction and the simple design it is also possible to effect considerable economy in the use of compressed air compared with brakes hitherto used. A further advantage of this new brake arrangement consists in the ability to adjust the brake action either automatically by the weight of the car or by a lever fixed on the outside frame of the car whereby the maximum brake action can be regulated at any time to the amount actually required say for empty cars, loaded cars, passenger trains, express trains, military cars. That is to say each car fitted with this new brake can be coupled up to any train which is of great importance. A car fitted with the new brake can also work together with the brakes now used if the brake action takes place through decrease of pressure in the main air pipe. Provision is also made where the brake power has been set to the maximum pressure necessary for ordinary traffic to double it for any sudden emergency, and this double brake power can be gradually still further increased. Provision is also made to prevent the maximum permissible brake action being exceeded, even if the apparatus should be set to a position beyond maximum effect either at the locomotive or at an individual car. This is necessary in order to prevent the brake acting so forcibly on the wheels that they are skidded or prevented from rotating. An important advantage of this new brake is, however, that its first cost, compared with that of other brakes, is very considerably reduced through simplicity of design. Another advantage is that the various parts for brakes with cylinders of the same dimensions, can be made of a standard pattern or interchangeable for all classes of trains which is of great importance for traffic and also for production in large quantities.

In order to enable the invention to be readily understood reference is made to the accompanying drawings in which:—

Figure 1 is a view partly in section and partly in elevation showing a general arrangement of a brake system embodying these improvements.

Fig. 2 is a longitudinal section of a modified construction of brake cylinder.

Fig. 3 is a longitudinal section of the pressure regulator indicated by D in Fig. 1.

Fig. 4 is a sectional elevation of a modified form of the piston K seen in Fig. 3.

Fig. 5 is a longitudinal section of a modified construction of certain of the parts seen in Fig. 3.

Fig. 6 is a sectional view of a valve device or combination for use in place of the valves $h^1$ $h^2$ and $v^1$ seen in Fig. 1.

Fig. 7 is a view similar to Fig. 1, of a modified arrangement.

Fig. 8 is a longitudinal section to a larger scale of a modified construction of regulating valve seen in Fig. 7.

Fig. 9 is a sectional elevation of another modified arrangement.

Fig. 10 is a longitudinal section to a larger scale of the valve M seen in Fig. 9.

Fig. 11 is a longitudinal section of another form of the valve seen in Fig. 10.

Fig. 12 is a sectional elevation of a modified arrangement comprising a brake cylinder having pressure fluid admitted to only one side of the piston thereof.

Fig. 13 is a sectional elevation illustrating controlling means adapted to automatically prevent excessive braking action, and Fig. 14 is a diagram of an alternative means for preventing excessive braking action.

Fig. 1 shows a general arrangement of the brake partly in section and partly in elevation. It consists of a single brake cylinder C, with brake piston $p$, air receiver B, pressure regulator D, back-pressure valve $v^1$, the cock $H^2$ for the emergency brake and a stop cock $H^1$, the main air pipe E and a driver's valve F on the locomotive. The pressure regulator D consists of an equilibrium piston valve S, Fig. 3, which is provided with passages $b$ and a hollow portion $a$. An equilibrium piston $c$ has a rod $d$ encircled by the pressure regulating spring $f^1$ and a spring $f^2$ and the piston K, which is directly loaded by the pressure from the main air pipe E, $E^2$, is balanced by the spring $f^2$. The casing of the pressure regulator is provided with a boss for the inlet pipe $e$ and a branch for the brake cylinder pipe $g$, with an outlet passage by way of $h$—$i$ and with a groove $k$. On the brake cylinder itself is a movable arm $m$ (Fig. 1) that is provided with a number of contact heads. The arm $m$ is operated by a lever fixed on the frame of the car and serves as a stop for the rod $d$ of the equilibrium piston $c$ in order to limit the movement of the rod $d$. In Fig. 5 is shown a different arrangement in which the passages $h$ are formed in the wall of the casing so as to give a more direct communication with the atmosphere.

The action of the brake is as follows:— Fig. 1 shows the brake in its released position. It is brought into action when the engine driver gradually opens the driver's brake valve F which should be preferably constructed as a pressure regulator. The compressed air will then flow from a pressure receiver on the locomotive, and maintained at a constant pressure of say 8 atmospheres by means of an air compressor and gradually fill the main air pipe E. This moves the regulating piston to the end of its outer stroke which is limited by the piston $c$ Fig. 3 and compresses the spring $f^2$. The piston $c$ at the same time moves the rod $d$ and the piston valve $s$ because of compression of the spring $f^1$. The exhaust passages $h$ are now closed and the inlet passage $k$ opened thus permitting the flow of compressed air to the left hand end of the brake cylinder through the groove $a$ and the passages $b$. Compressed air flows simultaneously through the back pressure valve $v'$ Fig. 1, and the pipes $E'$ to the air-receiver B and to the right hand end of the brake cylinder C. The air pressure entering the left hand end of the brake cylinder moves the piston valve $s$ back to its closing position until the axial pressure exerted on the piston valve $s$ by the compressed air equals the pressure of the spring $f'$. The axial pressure on the piston valve due to the compressed air is transmitted to the valve rod $d$ by the spring $f'$ but does not produce any axial loading on same as it is kept in equilibrium by the air pressure on the piston. It only produces tension in the material due to the pressure exerted by the spring $f^2$. The rod itself is in perfect equilibrium. The brake piston P (Fig. 1) advances to its right hand end position because the pressure on the left hand side of the brake piston exceeds the pressure on the right hand side by the amount which corresponds to the area of the piston rod. The air pressure is in this position the same on both sides of the brake piston and equal to that obtaining in the main inlet pipe E. When it is desired to operate the brake and to apply a definite brake pressure then the engine driver allows a small quantity of air to escape from the main pipe to atmosphere and thereby reduces the receiver pressure by say 0.2 of an atmosphere according to the brake pressure he wishes to apply to the train. The slight reduction in the pressure permits the piston K Fig. 3. and the rod $d$ to move to the left under the influence of the spring $f^2$. The piston valve $s$ follows this movement as the air pressure always holds the valve in equilibrium and opens the exhaust passages $h$ allowing the air pressure from the left hand end of the brake cylinder to escape. If the engine driver closes the driver's valve or if this valve is arranged as a pressure regulator the spindle will be locked so that no more air can escape from the main air pipe, the valve K is immediately arrested and the tension of the spring $f'$ presses the piston valve $s$ so far back that the exhaust passages $h$ are closed and the reduced air pressure on the valve balances the now reduced spring pressure of the spring $f'$. If the engine driver again allows air to escape from the main air pipe, exactly the same thing occurs as described above. The piston K moves farther and the piston valve $s$ opens the exhaust ports $h$ and allows the air to escape. If the engine driver closes the driver's valve then the piston K is at once arrested and the elastic force stored in the spring $f'$ pushes the piston valve $s$ back again to its closing position until the reduced elastic force balances the reduced air pressure, that is to say every position of the steering piston K gives a definite reduced pressure to the compressed air at the back of the pressure regulator and on the left hand side of the brake cylinder, or in other words it gives a definite brake pressure due to the difference in the pressure of the compressed air on both sides of the brake piston. If the engine driver again increases the air pressure in the main inlet pipe E by means of the driver's brake valve then the piston K and the piston valve $s$ move toward the right hand and opens the inlet port $k$ and this allows compressed air to flow into the brake cylinder. If the driver's brake valve is closed then the compressed air will only flow into the brake cylinder until the increased pressure in the same pushes the piston valve back to its closing position so that no more air can flow to the brake cylinder. This produces greater tension in the spring corresponding to the higher pressure in the brake cylinder, that is to say the effect due to the reduced pressure of the compressed air on the effective area of the valve pistons is always equal to the elastic force of the spring. The rod $d$ of the pressure regulator is in perfect equilibrium. The maximum force required to actuate the piston valve $s$ and the piston $c$ equals the frictional resistance of these small parts and is quite insignificant as they are in perfect equilibrium. The friction is so small that the piston valve $s$ and the piston $c$ will move downward if the regulator is placed in a vertical position. The regulation of the brake is therefore exceedingly sensitive and the slightest variation in pressure in the main air pipe effects the necessary movement of the piston K with absolute certainty as the following calculation will show. If the diameter of the piston valve $s$ is 45 m/m and this is sufficient for the largest brake-cylinders and the diameter of the piston K is 80 m/m then a pressure reduction of 0.1 atm. in the main inlet pipe E will produce a force about of 5 kg. available for moving the small piston valve $s$ and the balancing piston $c$, which move so easily that they do not require more than 1 kg. to overcome the resistance.

The pressure regulator itself therefore gives a very sensitive regulation as the frictional resistance of the piston valve in the casing and on the rod $d$ does not amount to more than 0.5 kg. against which the diameter of the rod 16 m/m produces an available effective surface of $$\frac{3.1416}{4} \times 4.5^2 - \frac{3.1416}{4} \times 1.6^2 = 13.9 \text{ cm.}^2.$$

A difference in the pressures of 0.10 atmosphere therefore gives a force of 1.39 kg. available for pushing the piston valve. It is therefore possible in consideration of the smallness of the piston valve to adjust the pressure regulator to differences of 0.10 atmosphere.

In the arrangement described above the volume of air, which corresponds to the displacement of the piston K, from a pressure reduction in the main pipe E, is carried back to it and therefore counteracts the pressure reduction in the main pipe, whereby the speed with which the brake effects the last or rear car compared with the first or forward car in the case of a long train may possibly become somewhat reduced. This volume however is very small and any such action will hardly occur. If it should occur it can be eliminated by shaping the piston K as shown on Fig. 4 where in case of a pressure reduction in the main inlet pipe the port $o$ will conduct to the additional space R the volume of air displaced by the piston K and if necessary also a larger volume.

The pressure reduction or air impulse is in this way not weakened but passes from the first part of the piston K to the next and so on. All pistons K are thus brought into braking positions in quick succession including the one in the last rearmost carriage.

The air impulse requires a certain time to reach the last carriage as the frictional resistance in long pipe lines absorbs a certain amount of energy and the brake action on the last car of a long goods train takes place somewhat later than on the first.

When the brake is released, the piston chamber or groove R is again shut off from the compressed air admission and the air, contained in same, escapes into the atmosphere through the hole $p$. In order to predetermine the maximum brake action for passenger and goods trains so that the engine driver shall not be able to exceed the same, the rod $d$ is provided with a collar $t$ which in one extreme position rests against the lever $n$ and carries an adjustable cam that can be set for any particular requirement. If the engine driver reduces the pressure in the main pipe very much, then the rod $d$ cannot follow the piston K any further than the cam permits. The piston K in that case will proceed alone and no longer exert any action on the regulating rod $d$. The arm $m$ may be made with parts of different thickness and adapted to be adjusted by a system of rods from the outside of the framing of the carriage. The maximum action of the brake is therefore adjusted in accordance with the thickness of the cam used for limiting the stroke of the rod $d$.

In order to obtain approximately the same percentage of brake action for empty and loaded cars, a cock may be provided between the pressure regulator D and the brake cylinder. The velocity of the air entering the brake-cylinder can be regulated by adjusting the cock, which in turn is effected by adjustment of the cam $m$. Therefore, it becomes possible by means of the easy adjustment of the cam $m$ to comply with the very important condition that it should be possible without difficulty to couple a carriage to any kind of railway train.

The air-receiver B and the back-pressure valve V' are provided in order that the desired effect of the brake shall be attained even if the pressure in the main pipe is unduly reduced or should disappear altogether, which will occur if the engine driver should allow the air to escape altogether, or if the train should become disconnected. The maximum effect of the brake can always be depended upon in these circumstances as the air in the receiver B cannot escape through the back-pressure valve to the main E and the pressure regulator also allows the air in the left hand end of the brake cylinder immediately to escape, whereby as above stated, the maximum braking effect is at once obtained.

It will be seen that the brake action on service brakes cannot with this arrangement be exhausted for instance during continuous long applications of the brake, or from leakages of the brake piston or the stuffing box of the brake piston rod as the high pressure in the main pipe E will always fill the air-receiver B if the pressure in the same should fall below that of the main supply pipe. This is of the very greatest importance for mountain railways and the like. Neither will perceptible leakages of the regulator itself cause any disturbance, as the regulator would at once automatically reproduce the pressure to which it is set if the pressure in the brake cylinder should decrease or increase.

In the pipe $E^2$ a cock $H^2$ is placed, which can be manipulated from the carriage. If the cock $H^2$ is opened the air contained in the pipe $E^2$ and also in the main supply pipe E will escape and this causes a quick application of the brake (emergency braking). In order to insure that this also shall not cause exhaustion of the brake action the cock $H^2$ is provided with a spring loaded valve $V^2$ the function of which is to prevent the reduction of pressure in the main supply pipe by an amount exceeding the amount required for producing the maximum brake action. If the cock $H^2$ is properly manipulated the brake can be worked from the carriage in exactly the same manner as from the locomotive, that is to say it can be adjusted to produce any desired brake action and also to be fully released.

It should be noticed that the brake action never depends upon the position on the brake piston, or upon the clearance space between the brake blocks and the wheels, but that it depends solely upon the pressure reduction or pressure increase in the main supply pipe E and in the pipe E².

If it is desired to disconnect the brake of a carriage and merely use the latter as a transmission carriage then the cock H' Fig. 6 is turned 90°. This permits the air from the pipe E² and from the left hand end of the brake cylinder to flow past the back-pressure valve V' to the pipe E'. The air from this pipe E' and the right hand end of the brake cylinder flows through the ports u through the opening w in the disconnecting cock H' and the port y to the atmosphere (see Fig. 6).

The brake piston is brought to its extreme right hand position by the spiral spring C' if not already in that position in order to prevent the brake blocks from touching the wheels after the air escaped.

Instead of a single brake cylinder and piston the cylinder may be lengthened and provided with two brake pistons p' and P² Fig. 2, whereby twice the amount of brake energy is obtained as compared with one piston. With this brake arrangement, the two ends of the brake cylinder are connected together and to the pressure main while the space between the pistons is connected to the pressure regulator or vice versa.

The brake installation can also be arranged in such a manner that the brake piston or pistons when in the release position is or are exposed on both sides to atmospheric pressure (zero) instead of compressed air, that is to say, compressed air of any suitable pressure can enter the brake cylinder on one side, Fig. 7. The action is the same in other respects, but with the additional advantage that the balancing piston c can be used also as the regulating piston K as seen in Fig. 8, and that no stuffing box is under pressure. A reduction of pressure in the main pipe causes the piston c K to move and establish a reduced air pressure in the brake cylinder corresponding to the displacement of the piston c K. The single brake cylinder may also in this case be lengthened and provided with a second brake piston as indicated on Fig. 7 whereby the same action produces twice the brake power compared with a single piston.

Adjustment of the brake action from the locomotive by pressure reduction in the main pipe E can also be achieved electrically, as the piston K and also the piston c and the rod d can be controlled directly by electricity, as for instance by use of a solenoid for drawing the piston rod d to the right in Fig. 8 against the action of a spring which tends to return the rod d and head X' to the position at the left seen in Fig. 8; thus both methods of control may for instance be used side by side or separately.

The total brake action obtained with the same air-pressure varies greatly with different velocities at the circumference of the car wheels as the coefficient of friction between the brakeblocks and the wheels decreases considerably with increased velocity. It is therefore necessary for emergency braking and with high velocities to increase the brake pressure considerably. This great brake power is however not permissible with decreasing speeds as the coefficient of friction increases greatly.

The maintenance of a high brake pressure would lock the wheels so firmly that friction between the wheels and the rails would be overcome and the wheels would skid on the rails. This should certainly be avoided because the friction between the wheels and the rails is reduced below the standard when the wheels are skidding, and it would be necessary to apply the brake for a longer period of time which would be dangerous in the case of emergency braking. The rolling stock is also exposed to very severe wear and tear while the wheels are skidding, and the wheels may easily become polygonal. In order to use this great brake power at high velocities, provision should be made for automatic adjustment of the air pressure on the brake piston proportionate to the changes in the coefficient of friction. These conditions are complied with in the brake arrangement shown in Figs. 9, 10, 11, 13 and 14.

The brake cylinder Fig. 9 is provided with two brake pistons which may have different diameters. A piston valve M Fig. 10 loaded either by a spring or by a weight is fitted to the brake cylinder or to the admission pipe from the pressure regulator D to the two brake pistons p' and P². The piston valve is loaded in such a manner by the spring O that only a pressure of say 4.5 atmosphere will displace it sufficiently to open the admission ports and permit high pressure air to flow through the port L' direct into the second cylinder end. The right hand brake piston is in this way suddenly loaded with the same pressure as the left hand end, that is to say the brake force is suddenly considerably increased and can be still further increased by means of the pressure regulator causing reduced pressure in the main supply pipe. If the pressure in this pipe is again regulated until the pressure in the brake cylinder is reduced below 4.5 atmospheres, the piston valve M will be pushed back by the spring O until the admission ports are closed and the ports T opened to allow the compressed air in the brake cylinder to escape to atmosphere. The left hand brake piston then again works alone as before the application of the emergency brake. For ordinary brake action the left hand brake piston alone is sufficient. The brake cylinder can be designed in such a manner that no stuffing box is under pressure. In Fig. 11 the piston M is differently constructed and works over ports Q r for the purpose of controlling communication with the atmosphere.

In order not to exceed the maximum brake action permissible, use is made of the brake action, or frictional resistance between the brake block and the wheel which when it becomes too great is made to open a valve, a piston valve or similar appliance, whereby compressed air from the main air receiver on the locomotive can flow direct into the main supply pipe, thus producing an increase in the pressure obtaining in same and decreased brake action. Fig. 13 shows an example of this arrangement.

The brake block is suspended from a rod 1 connected to another rod provided with two loose disks which are pressed apart by a spring 2 in a cylinder 3.

The rod 1 and the brake block are supported in such a manner that the spring 2 will oppose an equal force in both directions to the movement of the rod. The rod 1 together with the spring 2 must therefore absorb the frictional force between the brake block and the wheel. The spring is adjusted in such a manner that the brake block and the suspension rod are moved when the maximum brake-action is exceeded, that is, when the frictional force becomes excessive. This movement is utilized to open a valve 4 or any similar arrangement which permits air of a higher pressure to flow from the main receiver into the main supply pipe, whereby the pressure in the brake cylinder is decreased. As soon as the permissible brake action is restored, the rod 1 and the brake block are brought back to their normal position by the force of the spring, and the valve 4 is shut, with this arrangement it is only necessary to arrange the apparatus shown in Fig. 13 on the locomotive.

The apparatus described may also act direct on the brake cylinder in which case the valve regulates the outlet opening from the cylinder independent of the pressure regulator D. This arrangement, however, is somewhat expensive as every carriage must be provided with the apparatus Fig. 13. The regulation on the main pipe is better as under the direct regulation the brake blocks easily begin to slip, whereby they are apt to chatter or knock. If the brake action depends upon an increase of pressure in the main pipe E the valve 4 must be inserted directly in same, and will then release the air from the main pipe when the brake action exceeds the maximum amount permitted.

The safety apparatus can also embody a band brake device shown in Fig. 14.

This arrangement consists of a brake drum with a brake-band 5, a lever 6, a compressed air cylinder 7, a valve 8 and a spring 9. These parts are connected in such a manner that upon air being admitted to the cylinder 7, which is in direct communication with the brake cylinder of the vehicle the rod 6 moves downward swinging around the fulcrum 11 as the spring 9 has a certain initial compression. The brake band is tightened around the drum and the brake action is increased gradually as the pressure in the cylinder 7 increases.

The brake-band is tensioned which gives a resulting upward force at the point 12 as indicated by the arrow heads. The further operation by the piston 10 turns the lever about the point 12 as a fulcrum and this further compresses the spring 9, thereby lifting the valve 8. If the brake pressure in the safety apparatus is increased either through and increased in the value of the coefficient of friction when the speed of the train decreases, or by an increase of the pressure in the brake cylinder, the vertical resultant of the force in the band is proportionately increased whereby the valve is lifted and the pressure in the brake cylinder is decreased as described above until the spring 9 overcomes the force acting at the point 12 and closes the valve.

The safety appliance can also be provided with two cylinders 7 acting on the lever 6 similar to the brake arrangement with two brake pistons. The cylinders are then connected by a pipe in which a piston valve M is fixed, which as above described regulates the bringing into operation of the second cylinder at a given pressure of the compressed air. Instead of being connected to the piston 10 of the cylinder 7 the lever 6 may be connected directly to the tension or compression rods of the brake. The brake drum of the safety apparatus is to run at the same circumferential speed as the car wheels and is to be made of steel while the brake band is to be lined with cast iron and suspended from springs in order not to rub against the brake disk when the brake is not in use.

Having thus described my invention, what I claim as new, and desire to secure by Letters Patent, is—

1. In an air brake, the combination comprising a brake cylinder, a main air line, a pressure regulator casing having connections with said cylinder and air line, a piston valve slidable within said casing to control communication between the cylinder and air line acted upon by the pressure within the brake cylinder, a regulator piston in said casing acted upon by line pressure on one side, a spring arranged to act upon said piston in opposition to air line pressure, and a spring disposed between said valve and piston and adapted to close said valve after reduction of pressure in the brake cylinder.

2. In an air brake, the combination comprising a brake cylinder, a main air line, a pressure regulator casing having connections with said cylinder and air line, a regulator piston in said casing acted upon by line pressure on one side, a spring arranged to resist movement of said piston due to air line pressure, a piston valve slidable within said casing acted upon by the pressure within the brake cylinder, a spring disposed between said valve and piston and adapted to resist movement of the valve toward the piston under said braking pressure, and means for varying the main line pressure, whereby every variation of pressure in the air line corresponds to a certain braking pressure.

3. In an air brake, the combination comprising a brake cylinder, a main air line, a pressure regulator casing having connections with said cylinder and air line and atmospheric ports, a piston valve slidable within said casing controlling communication between the cylinder and the air line and the atmosphere, a regulator piston in said casing acted upon by line pressure on one side, a spring arranged to resist movement of said piston due to air line pressure, and a spring disposed between said valve and piston, whereby pressure in the air line acts on said piston to open said valve to charge the brake cylinder.

4. In an air brake, the combination comprising a brake cylinder, a main air line, a pressure regulator casing having connections with said cylinder and air line, a regulator piston in said casing acted upon by line pressure on one side, a spring arranged to resist movement of said piston due to air line pressure, an equilibrium piston acted on by the pressure within the brake cylinder, a rod connecting said pistons, a piston valve slidable within said casing and with respect to said rod, and acted upon by the pressure within the brake cylinder, a spring disposed between said valve and regulator piston and adapted to move the valve away from the piston in opposition to said braking pressure to close the valve on sufficient reduction of said pressure, and means for varying the main line pressure.

5. In an air brake, the combination comprising a brake cylinder, a main air line, a pressure regulator casing having connections with said cylinder and air line, and atmospheric ports, a piston valve slidable within said casing provided with an annular groove adapted to register with the air line connection in one position and with the atmospheric ports in another, and provided with passages from said groove to the end of the valve communicating with the brake cylinder, a regulator piston in said casing acted upon by line pressure on one side, a spring arranged to resist movement of said piston due to air line pressure, and a spring disposed between said valve and piston and adapted to resist movement of the valve toward the piston under pressure in said brake cylinder.

6. In an air brake, the combination including means for bringing the brake into action simultaneously in all cars, comprising a brake cylinder, a main air line, a pressure regulator casing having connections with said cylinder and air line, a regulator piston in said casing acted upon by line pressure on one side, a chamber adapted to receive air released from said regulator piston on reduction of air line pressure, means for escape of air from said chamber on restoration of the regulator piston to initial position, a spring arranged to resist movement of said piston due to air line pressure, a piston valve slidable within said casing acted upon by the pressure within the brake cylinder, a spring disposed between said valve and piston and adapted to resist movement of the valve toward the piston under said braking pressure, and means for varying the main line pressure.

7. In an air brake, the combination comprising a brake cylinder, a main air line, a pressure regulator casing having connections with said cylinder and air line, a regulator piston in said casing acted upon by line pressure on one side, a spring arranged to resist movement of said piston due to air line pressure, an equilibrium piston acted on by the pressure within the brake cylinder, a rod connecting said pistons, an adjustable stop to limit the movement of said rod, a piston valve slidable within said casing and with respect to said rod, and acted upon by the pressure within the brake cylinder, a spring disposed between said valve and regulator piston and adapted to move the valve away from the piston in opposition to said braking pressure to close the valve on sufficient reduction of said pressure, and means for varying the main line pressure.

8. In an air brake, the combination comprising a brake cylinder, a main air line, a pressure regulator casing having connections with said cylinder and air line, a regulator piston in said casing acted upon by line pressure on one side, a spring arranged to resist movement of said piston due to air line pressure, a piston valve slidable within said casing acted upon by the pressure within the brake cylinder, a spring disposed between said valve and piston and adapted to resist movement of the valve toward the piston under said braking pressure, and a cock and valve arrangement disposed between said main line and regulator casing whereby the brake may be applied on an individual car without reduction of main air line pressure below that lowest pressure in the main air line which is necessary in order to obtain maximum braking force so that the braking force can never be exhausted.

9. In an air brake, the combination comprising a brake cylinder, a main air line, a pressure regulator interposed between said cylinder and air line, and a cock and valve arrangement for rendering one braking cylinder inactive without affecting the other brakes of a train, irrespective of whether the brake is put into action by reduction of pressure in the main line, or the brake is released by normal pressure in the main line.

10. In an air brake, the combination comprising a brake cylinder, a main air line, a pressure regulator interposed between said cylinder and air line, a spring arranged to control movement of said regulator in one direction, and electro-magnetic means for controlling movement of said regulator in the other direction.

In testimony whereof I have signed my name to this specification.

GUSTAV DROLSHAMMER.

Witnesses:
KALLUIM SYDEUS,
NILS VERSVIK.